United States Patent [19]

Ichikawa

[11] Patent Number: 4,633,497

[45] Date of Patent: Dec. 30, 1986

[54] SEPARATION CONTROL CIRCUIT

[75] Inventor: Toshihito Ichikawa, Saitama, Japan

[73] Assignee: Pioneer Electronic Corporation, Japan

[21] Appl. No.: 766,315

[22] Filed: Aug. 16, 1985

[30] Foreign Application Priority Data

Aug. 17, 1984 [JP] Japan ................ 59-171126

[51] Int. Cl.[4] .................... H04H 5/00
[52] U.S. Cl. ................................ 381/10
[58] Field of Search ............ 381/2, 10, 11, 13, 27, 381/3, 4, 17, 18

[56] References Cited

U.S. PATENT DOCUMENTS 3,943,293  3/1976  Bailey .................... 381/10
4,039,755  8/1977  Berkovitz ................ 381/27
4,198,543  4/1980  Schertz et al. ........... 381/10
4,221,928  9/1980  Franssen et al. ......... 381/13

Primary Examiner—Forester W. Isen
Attorney, Agent, or Firm—Sughrue, Mion, Zinn, Macpeak and Seas

[57] ABSTRACT

A separation control circuit for a stereophonic receiver in which both the amount of separation between right- and left- channel signals is reduced and the amplification gain for higher frequency components of the two channel signals is reduced as the field strength of the received signal decreases. Thereby, the signal-to-noise ratio of the reproduced signal in the presence of a weak received signal is significantly improved. A single low-pass filter for each channel is used for both functions.

5 Claims, 4 Drawing Figures

SEPARATION CONTROL CIRCUIT

BACKGROUND OF THE INVENTION

The present invention relates to a separation control circuit for a stereophonic receiver, and more particularly to a separation control circuit for preventing deterioration of the SN (signal-to-noise) ratio of the reproduced signal by controlling the amount of separation of a stereophonic signal in proportion to the received field strength.

In a conventional separation control circuit as shown in FIG. 1, left- and right-channel signals L and R are applied to respective output terminals $L_o$ and $R_o$ through respective coupling capacitors $C_2$ and $C_3$. A variable impedance circuit composed of a parallel combination of transistors 20 and 21 and a series-connected capacitor $C_1$ for mixing purposes is connected between the terminals $L_o$ and $R_o$. An AGC voltage is applied to control the output current of a variable current source 22, and the current output of the latter is applied as a bias current to the bases of the transistors 20 and 21 so that the impedance of the variable impedance circuit is controlled thereby.

In the circuit thus arranged, the impedance Z of the variable impedance circuit changes in proportion to changes in the AGC voltage, the latter varying according to the received field strength. Because the impedance Z becomes smaller as the received strength drops, the high-frequency components of the left- and right-channel signals L and R will be reduced due to an increased amount of mixing between channels through the variable impedance circuit. Accordingly, with it so arranged that current from the current source 22 increases when the AGC voltage decreases as the field strength is reduced, lowering of the SN ratio in the reproduced signal is reduced because of a reduction in the high-frequency separation when the field strength drops.

As set forth above, separation in the high-frequency range is reduced as the impedance Z of the variable impedance circuit approaches 0. However, because the frequency characteristics of the amplifier do not change when the amount of separation is reduced, still there can occur some degeneration of the SN ratio when the field strength is lowered. To change the frequency characteristics of the amplifier circuit together with the separation, it is necessary to provide for each channel an LPF (Low-Pass Filter) in addition to those components shown in FIG. 1. This results in a complex circuit configuration.

SUMMARY OF THE INVENTION

The present invention is intended to eliminate such drawbacks of the conventional circuit, and it is therefore an object of the present invention to provide a separation control circuit for simultaneously controlling separation and frequency characteristics using only one LPF for each of two channels.

The separation control circuit according to the present invention comprises a low-pass filter allowing the low-frequency component of the sum signal of first and second channel signals of a stereophonic signal to pass, mixing means for mixing the output of the low-pass filter with the first and second channel signals of the stereophonic signal, and control means for controlling the mixture ratio effected by the mixing means in proportion to the field strength of the received signal.

DESCRIPTION OF THE PREFERRED EMBODIMENTS

Figure 1:
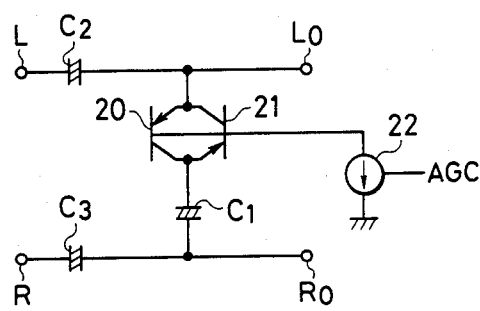
FIG. 1 is a block diagram of a conventional separation control circuit.

Referring now to the drawings, the present invention will be described in detail with reference to preferred embodiments.

Figure 2:
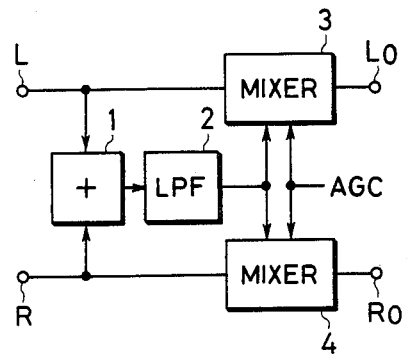
FIG. 2 is a block diagram of a separation control circuit embodying the present invention.

FIG. 2 is a block diagram of a preferred embodiment of a separation control circuit of the present invention. In this circuit, left and right channel signal L and R are summed by an adder 1 to produce a sum signal (L+R), which is applied to one input of each of the mixers 3 and 4 through an LPF 2, whereas the channel signals L and R are respectively supplied to the other inputs of the mixers 3 and 4. The outputs of the mixers 3 and 4 form the stereophonic outputs $L_o$ and $R_o$ of the separation control circuit. The mixture ratio effected by the mixers 3 and 4 is controlled by an AGC voltage.

Given that the output of the adder 1 is (L+R)/2 and that of the LPF 2 is $(L_1+R_1)/2$, the outputs of the mixers 3 and 4 are, respectively:

$$L_o = KL + (1-K)\cdot(L_1+R_1)/2,$$

and $$R_o = KR + (1-K)\cdot(L_1+R_1)/2,$$

where K ($0 \leq K \leq 1$) is the mixture ratio of the mixers, and K is a variable dependent on the AGC voltage.

As is evident from these equations, assuming that K=1 when the field strength is strong, $L_o=L$ and $R_o=R$, and the resulting full separation assures normal stereophonic reception. As the field strength is reduced, the value of K gradually decreases, causing a loss of separation. If K drops to substantially 0, $$L_o = (L_1+R_1)/2,$$

and $$R_o = (L_1+R_1)/2,$$

and both channel outputs become a sum signal with reduced high-frequency components. This sum signal is a monaural signal. In other words, the amount of separation is reduced as the field strength drops, and the high-frequency components are also reduced, with the result that the frequency characteristics are also caused to change. Consequently, it becomes possible to maintain a SN ratio superior to that of the conventional circuit.

Figure 3:
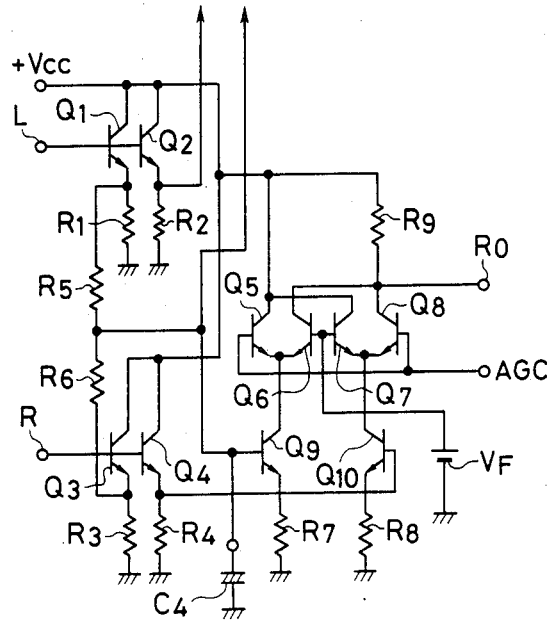
FIG. 3 is a circuit diagram illustrating an example of a portion of the circuit of FIG. 2.

FIG. 3 is a circuit diagram of that portion of the circuit of FIG. 2 used for processing the right-channel signal. The circuit arrangement for the processing of the left-channel signal is identical.

Transistors $Q_1$ and $Q_2$ and resistors $R_1$ and $R_2$ act as buffers with the L-channel signal as an input, whereas transistors $Q_3$ and $Q_4$ and resistors $R_3$ and $R_4$ act as buffers with the R-channel signal as an input. The L- and R-channel signals are summed by resistors $R_5$ and $R_6$. The high-frequency component of the resulting signal is removed with a capacitor $C_4$, and the remaining low-frequency component applied to the base of the transistor $Q_9$. The transistor $Q_9$ and a resistor $R_7$ constitute the current source of a differential amplifier formed by transistors $Q_5$ and $Q_6$. The R-channel signal is supplied to the base of a transistor $Q_{10}$ through the transistor $Q_4$. The transistor $Q_{10}$ and a resistor $R_8$ constitute the current source of a differential amplifier formed by transistors $Q_7$ and $Q_8$. The AGC voltage is applied to the differential inputs of those differential amplifiers. The output signal $R_o$ is derived across the load resistor $R_9$ of the commonly connected collectors of the transistors $Q_6$ and $Q_8$. $V_F$ designates the bias voltage of the differential amplifiers. Obviously, the current flowing through the resistor $R_9$ depends upon the AGC voltage.

The cut-off frequency $f_c$ of the LPF in this case is:

$$f_c = (R_5 + R_6)/(2\pi R_5 R_6 C_4).$$

In the above-described circuit, as the field strength of the received signal drops, the amount of separation in the low-frequency range decreases while the high-frequency components are reduced in the reproduced signal.

Although the sum signal is obtained by adding the right- and left-channel signals in the above example, it is also acceptable to employ a sum signal from a detecting circuit in the preceding stage of the separation circuit and to supply the same to the LPF. Such a detecting circuit is described in, for example, Japanese patent publication No. 59-15424.

Figure 4:
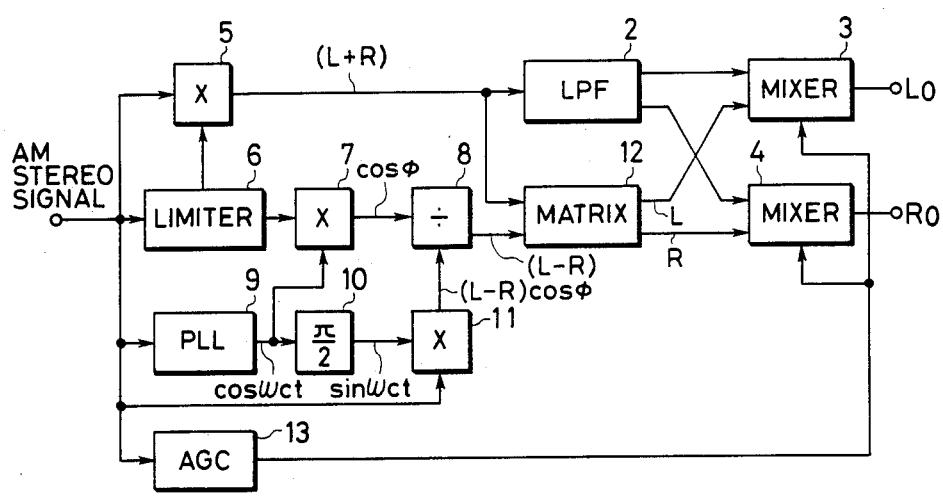
FIG. 4 is a block diagram illustrating an application of the present invention.

FIG. 4 is a block diagram illustrating such an example applied to an AM stereophonic receiver of the Motorola type. Like reference numerals and characters designate like elements in FIG. 2.

In FIG. 4, the output of a limiter 6 and an AM stereophonic signal are multiplied by a synchronous detector 5, whereby a main signal (L+R) is detected. A signal of the form $\cos \omega_c t$ obtained from a PLL circuit 9 and the output of the limiter 6 are multiplied by a multiplier 7 to detect $\cos \phi$. The output of the PLL circuit 9 is shifted by $\pi/2$ by a phase shifter 10 to obtain $\sin \omega_c t$, which is multiplied by the AM stereophonic signal by a multiplier 11 to thus derive $(L-R)\cdot\cos \phi$. Then, a driver 8 divides $(L-R)\cdot\cos \phi$ by $\cos \phi$ previously obtained, whereby a subsignal $(L-R)$ is detected. The left- and right-channel signals L and R are extracted by a matrix circuit 12 using the main and sub signals, which are applied as inputs to mixers 3 and 4, respectively. The main signal (L+R) is applied to the other inputs of both mixers through an LPF 2. The mixing ratio of the mixers 3 and 4 is controlled by the AGC voltage of an AGC circuit.

In this example, degradation of the SN ratio is also prevented since the amount of separation and the frequency response characteristics are made variable depending on the field strength in the same manner as described with reference to FIG. 2.

Accordingly, the present invention maintains a good SN ratio in the presence of field strength changes because the separation and frequency characteristics are simultaneously controlled using a single LPF for each channel. Since a single grounded capacitor is used in the LPF as shown in FIG. 3, it is only necessary to add a single pin for external connection when employing an integrated circuit construction.

Particularly, because frequency characteristics as well as the amount of separation are varied, the present invention may be effectively applied to stereophonic radio receivers wherein the difference in the SN ratio between stereophonic and monaural system is small.

I claim:

1. A separation control circuit comprising: an adder for summing first and second channel signals of a stereophonic signal; a single low-pass filter for passing only a low-frequency component of a sum signal produced by said adder; first and second mixing means for mixing an output of said low-pass filter with said first and second channel signals, respectively, of said stereophonic signal; and means for controlling a mixing ratio imparted by said mixing means in response to a field strength of a received signal.

2. The separation control circuit of claim 1, wherein said low-pass filter comprises a single capacitor.

3. The separation control circuit of claim 1, wherein each of said mixers comprises: first and second differential amplifiers each comprising a differential transistor pair, first transistors of each of said differential pairs having bases connected together and to a source of a reference voltage and collectors connected through a load resistance to a supply voltage, an automatic gain control voltage being applied to a bases of second transistors of each of said differential pairs; first and second current source transistors connected in series with commonly connected emitters of said first and second transistors of respective ones of said differential pairs, said first current source transistor receiving as a base input an output of said low-pass filter, and said second current source transistor receiving as an input a respective one of said first and second channel signals.

4. The separation control circuit of claim 3, wherein said low-pass filter comprises a single capacitor coupled to a base of said first current source transistor.

5. The separation control circuit of claim 4, further comprising buffer circuit means for buffering each of said first and second channel signal prior to application of said first and second channel signals to said adder and said mixing means.

* * * * *